United States Patent Office 3,578,691
Patented May 11, 1971

3,578,691
ORGANIC 1,3,2,4-DIAZADISILETIDINES
AND PROCESS
Walter Fink, Zurich, Switzerland, assignor to
Monsanto Company, St. Louis, Mo.
No Drawing. Filed Nov. 25, 1968, Ser. No. 778,798
Int. Cl. C07f 7/02; C07d 103/02
U.S. Cl. 260—448.2                                    5 Claims

ABSTRACT OF THE DISCLOSURE

Organic 1,3,2,4-diazadisiletidines of the formula

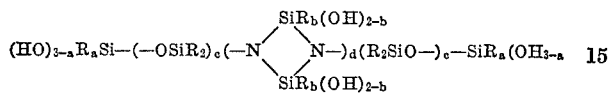

and process for making by gradually adding the corresponding halo compound wherein the hydroxyl groups are replaced by reactive halogen atoms to a mixture or solution comprising water and an acid-binding agent.

---

The present invention relates to organic 1,3,2,4-diazadisiletidines containing at least one hydroxy group attached to a silicon atom and a process for making these compounds which have the general formula

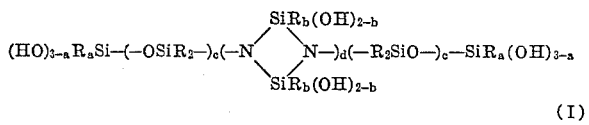

in which R signifies a hydrogen atom, a possibly substituted and/or ethylenically or acetylenically unsaturated hydrocarbon group heterocyclic group or a silyl group which can also be attached via an oxygen atom and the silyl groups can also be attached via a divalent hydrocarbon group to their silicon atom, two R groups on the same silicon atom taken together with their silicon atom signify a heterocyclic group, $a$ signifies 2 or 3, $b$ 1 or 2, $c$ 0 or 1–4 and $d$ 1–5.

It has been found that the compounds of Formula I are obtained when a corresponding organic 1,3-disilyl-1,3,2,4-diazadisiletidine containing at least one reactive halogen atom attached to a silicon atom and corresponding to the general formula

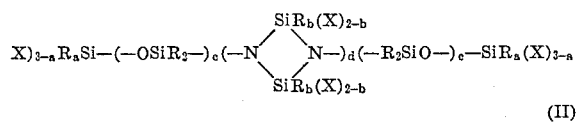

wherein R, $a$, $b$, $c$ and $d$ have the same significance as above and X represents a reactive halogen atom, is gradually added with stirring to a mixture or solution comprising water and an acid-binding agent such as, for example, NaOH, CaO, $Na_2CO_3$ and tertiary amines.

An especially advantageous embodiment of the process is based on the gradual addition with stirring of a solution of the compound II, in an inert solvent which is not miscible with water, such as, for example, hexane, benzene and so on, to a mixture consisting of water and a lower trialkylamine, such as, for example, trimethylamine, triethylamine and tripropylamine. The reaction mixture consists of two phases in this case.

The hydrolysis of halosilanes by water to the corresponding hydroxysilane is well known. However, if to a mixture of the starting compound (II) in which, for example, R is a methyl group, $a=2$, $b=2$, $c=0$ and $d=1$, and of a base, for example, triethylamine, water is added in usual manner, there are obtained as a rule besides polymeric products about 30–40% of a compound of the formula (III)

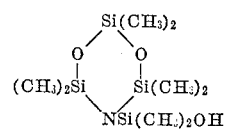

whereas the desired compound (I) is not formed in noteworthy quantity.

Among the compounds of invention only 1,3-bis-(dimethylhydroxysilyl) - 2,2,4,4 - tetramethyl - 1,3,2,4 - diazadisiletidine has been known till now. This compound has been prepared from 1,3 - bis - (dimethylaminosilyl)- 2,2,4,4 - tetramethyl - 1,3,2,4 - diazadisiletidine by hydrolysis in moist ether or in contact with atmospheric moisture in 35–40% yield (L. W. Breed et al., J. Organomet. Chem. 6, 676 (1966)).

This process is circumstantial and relatively small yields are obtained. Certain analogous compounds such as, for example, 1,3 - bis - (diphenylhydroxysilyl) - derivatives cannot be prepared by this process because of the unreactivity of the precursory 1,3 - bis - (diphenylchlorosilyl)-derivatives.

The compounds of invention are valuable intermediary products, since the hydrogen atom of the hydroxyl group can be replaced for organic groups, silyl groups, metal atoms etc. in usual manner known for silanols. The preparation of the metal derivatives and their reaction with halosilanes is shown in copending application Ser. No. 778,841, filed of even date.

It has further been found that the compounds condense under cleavage of water on heating at, e.g., 250° C., whereby rubbery transparent polymers are formed.

The starting compounds II having $n=1$ can be prepared alkali silanolate as is shown in copending application Ser. No. 724,592, filed Apr. 26, 1968, by reaction of a cyclic silazane of the formula (IV)          $(R^1R^2SiNH)_a$      ($a=3$ or 4)

for example, hexamethylcyclotrisilazane with a halosilane of the formula (V)                    $R^1R^2SiX_2$ in a molar ratio of 1:$a$ in the presence of a hydrogen halide-binding agent, or by heating a linear silazane of the formula $XR^1R^2SiNHSiR^1R^2X$, e.g., tetramethyl-1,3-dichlorodisilazane, in the presence of a hydrogen halide-binding agent and subsequent further reaction with an alkali silanolate as is shown in copending applications Ser. No. 724,585, filed Apr. 26, 1968.

The same starting compounds, but also those having $n>1$, can be prepared according to copending application Ser. No. 658,629, filed Aug. 7, 1967, by reacting a cyclosilazane as formulated above and a halosilane in a maximum molar ratio of $$1:\frac{a}{1.5}$$

without presence of hydrogen halide-binding agent. In this process there are formed oligomeric to polymeric products having increasing $n$ with decreasing amount of halosilane, whereby less and less monomeric products are formed. Whereas with, e.g., hexamethylcyclotetrasilazane and halosilane in a ratio of 1:2 about 80% monomeric products are formed, only about 5% are present using a ratio of 1:1. The further reaction with an alkali silanolate can be achieved as already mentioned.

Additional starting compounds II can be prepared according to, for example, copending application Ser. No. 733,329, filed May 31, 1968, by reacting a 1,3-disilyl-1,3,2,4-diazodisiletidine with a halosilane, i.e. by resilylation, and subsequent further reaction with an alkali silanolate.

The group R is governed with the available halosilanes, since they always serve originally as the first starting compounds in the preparation of the starting compounds II. Examples of possible organic groups and silyl groups are largely enumerated and explained in, for example, copending application Ser. No. 724,585, filed April 26, 1968.

EXAMPLE 1

8.4 g. (0.0027 mole) of 1 - dimethylchlorosilyl - 3-trimethylsilyl-2,2,4,4-tetramethyl - 1,3,2,4 - diazadisiletidine, dissolved in 20 ml. of hexane, are added dropwise with stirring to a mixture of 100 ml. of triethylamine and 30 ml. of water. After vigorous stirring for 15 minutes, the mixture is shaken three times with water and the amine and solvent are distilled off under reduced pressure at 30–50° C. The crystalline residue is practically pure according to the NMR spectrum.

Yield 7.82 g. (98.9%) 1 - dimethylhydroxysilyl-3-trimethylsilyl - 2,2,4,4 - tetramethyl - 1,3,2,4-diazadisiletidine; M.P. 56° C.

Calc'd for $C_9H_{28}ON_2Si_4$ (percent): C, 36.93; H, 9.64; N, 9.57 (MW 292.7). Found (percent): C, 36.91; H, 9.54; N, 9.53 (MW 291).

The preparation of the lithium salt is accomplished by adding gradually 13.8 g. (0.047 mole) of the silanol with stirring to 31 ml. of a solution of butyllithium in hexane (1.53 normal solution). The solvent is removed under vacuum and the residue dried at about 40° C.

EXAMPLE 2

From 1,3 - bis - (dimethylchlorosilyl) - 2,2,4,4-tetramethyl-1,3,2,4-diazadisiletidine there is obtained the 1,3-bis-(dimethylhydroxysilyl) - 2,2,4,4 - tetramethyl-1,3,2,4-diazadisiletidine practically in quantitative yield; M.P. 125° C.

Calc'd for $C_8H_{26}O_2N_2Si_4$ (percent): C, 32.61; H, 8.89; N, 9.51 (MW 294.67). Found (percent): C, 33.07; H, 8.59; N, 9.67 (MW 289).

EXAMPLE 3

5.4 g. (0.01 mole) of 1,3 - bis - (diphenylchlorosilyl)-2,2,4,4 - tetramethyl - 1,3,2,4 - diazadisiletidine, dissolved in 100 ml. of benzene, are added dropwise with stirring to a mixture consisting of 50 ml. of triethylamine and 20 ml. of water. One proceeds as in Example 1.

Yield 5.1 g. (93%) of bis - (diphenylhydroxysilyl)-2,2,4,4 - tetramethyl - 1,3,2,4 - diazadisiletidine; M.P. 148.5° C. (from hexane).

Calc'd for $C_{28}H_{34}O_2N_2Si_4$ (542.9) (percent): C, 61.94; H, 6.34; N, 5.16. Found (percent): C, 61.81; H, 6.52; N, 5.20.

EXAMPLE 4

8.3 g. (0.01 mole of 1,3 - bis - (diphenylchlorosilyl)-2,2,4,4 - tetraphenyl - 1,3,2,4 - diazadisiletidine, dissolved in 100 ml. of xylene, are added dropwise with stirring to a mixture consisting of 50 ml. of triethylamine and 20 ml. of water. One proceeds as in Example 1.

Yield 7.4 g. (94%) of 1,3-bis-(diphenylhydroxysilyl)-2,2,4,4 - tetraphenyl-1,3,2,4-diazadisiletidine; M.P. 158° C. (from xylene).

Calc'd for $C_{48}H_{42}O_2N_2Si_4$ (79.12) (percent): C, 72.86; H, 5.35; N, 3.54. Found (percent): C, 73.92; H, 5.32; N, 3.66.

EXAMPLE 5

12.4 g. (0.017 mole) of 1,3 - bis - (diphenylchlorosilyl)-2,2 - diphenyl - 4,4 - dimethyl-1,3,2,4-diazadisiletidine, dissolved in 50 ml. of benzene, are added dropwise with stirring to a mixture consisting of 100 ml. of triethylamine and 20 ml. of water. One proceeds as in Example 1.

Yield 11.7 g. (100%) of 1,3 - bis - (diphenylhydroxysilyl) - 2,2 -diphenyl - 4,4 - dimethyl-1,3,2,4 - diazadisiletidine; 146–147° C. (from hexane).

Calc'd for $C_{38}H_{38}A_2N_2Si_4$ (667.09) (percent): C, 68.42; H, 5.74; N, 4.20. Found (percent): C, 68.32; H, 5.61; N, 4.35.

EXAMPLE 6

12.6 g. (0.02 mole) of 1,3-bis-(5-chlorohexamethyltrisiloxanyl) - 2,2,4,4 - tetramethyl - 1,3,2,4 diazadisiletidine dissolved in 20 ml. of light petroleum are added dropwise with vigorous stirring to a mixture of 50 ml. of triethylamine and 3 ml. of water. The mixture is stirred for 1 hour at room temperature, then heated quickly to boiling, the hydrochloride is filtered off after cooling and the residue is shaken twice with water. After all the volatile matter has been distilled off at room temperature under vacuum, the oily residue is treated under high vacuum at 70–80° C. till it reaches constant weight.

Yield 11.7 g. (99%) of 1,3-bis-(5-hydroxyhexamethyltrisiloxanyl - 2,2,4,4 - tetramethyl - 1,3,2,4 - diazadisiletidine;

*Analysis.*—Calc'd for $C_{16}H_{50}N_2O_6Si_8$ (591.3) (percent): C, 32.50; H, 8.51; N, 4.74. Found (percent): C, 32.18; H, 8.63; N, 4.44.

EXAMPLE 7

11.7 g (0.015 mole) of 1,3 - bis-(7-chlorooctamethyltetrasiloxanyl) - 2,2,4,4 - tetramethyl-1,3,2,4-diazadisiletidine are treated as in Example 6.

Yield 11.1 g. (100%) of 1,3 - bis - (7-hydroxyoctamethyltetrasiloxanyl) - 2,2,4,4-tetramethyl - 1,3,2,4-diazadisiletidine.

*Analysis.*—Calc'd for $C_{20}H_{62}N_2O_2Si_{10}$ (739.6) (percent): C, 32.48; H, 8.45; N, 3.79. Found (percent): C, 31.95; H, 8.60; N, 3.35.

What I claim is:

1. A process for preparing organic 1,3-disilyl-1,3,2,4-diazadisiletidines containing at least one hydroxy group attached to a silicon atom of formula

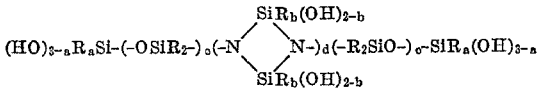

in which R signifies a lower alkyl radical or a phenyl group, $a$ signifies 2 or 3, $b$ 1 or 2, $c$ 0 or 1–4 and $d$ 1–5, characterized in that an organic 1,3-disilyl-1,3,2,4- diazadisiletidine containing at least one reactive halogen atom attached to a silicon atom of the formula

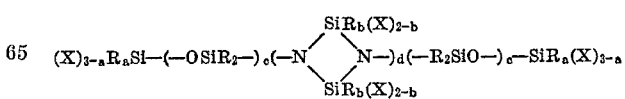

in which, R, $a$, $b$, $c$ and $d$ have the same significance as above and X represents a reactive halogen atom, is gradually added with stirring to a mixture or solution comprising water and an acid-binding agent.

2. A process of claim 1, characterized in that a solution of the halide in a solvent which is substantially immiscible with water like hexane and benzene is gradually added with stirring to a mixture comprising water and a lower trialkylamine like trimethylamine, triethylamine and tripropylamine.

3. An organic 1,3-disilyl-1,3,2,4-diazadisiletidine compounds of the formula

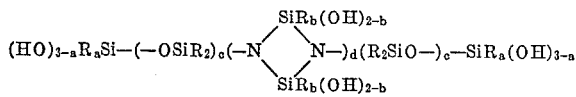

in which R signifies a lower alkyl radical or a phenyl group, $a$ signifies 2 or 3, $b$ 1 or 2, $c$ 1–4 and $d$ 1–5.

4. A compound of claim 3 wherein $a$ is 2, $b$ is 2, $c$ is 2, $d$ is 1, and the R groups are methyl.

5. A compound of claim 3 wherein $a$ is 2 $b$ is 2, $c$ is 3, $d$ is 1, and the R groups are methyl.

References Cited

UNITED STATES PATENTS 3,414,584  12/1968  Fink _____ 260—448.2X

OTHER REFERENCES

Breed et al., J. Organometallic Chem., vol. 6, (1966), pages 676–9, QD 411 J 6.

TOBIAS E. LEVOW, Primary Examiner

C. F. W. BELLAMY, Assistant Examiner

U.S. Cl. X.R.

260—448.2R, 448.2B